(12) United States Patent
Iyer et al.

(10) Patent No.: US 12,099,852 B2
(45) Date of Patent: Sep. 24, 2024

(54) LOCATION-BASED COMPUTER CONFIGURATION

(71) Applicant: Dell Products L.P., Round Rock, TX (US)

(72) Inventors: Vivek Viswanathan Iyer, Saint Johns, FL (US); Vivekanandh Narayanasamy Rajagopalan, Bangalore (IN); Gokul Thiruchengode Vajravel, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 44 days.

(21) Appl. No.: 17/844,389

(22) Filed: Jun. 20, 2022

(65) Prior Publication Data
US 2023/0409343 A1    Dec. 21, 2023

(51) Int. Cl.
| | |
|---|---|
| G06F 9/4401 | (2018.01) |
| G06F 8/60 | (2018.01) |
| G06F 9/445 | (2018.01) |
| G06F 15/177 | (2006.01) |
| G06Q 10/02 | (2012.01) |

(52) U.S. Cl.
CPC .......... *G06F 9/4411* (2013.01); *G06Q 10/02* (2013.01); *G06F 8/60* (2013.01); *G06F 9/44505* (2013.01); *G06F 9/4451* (2013.01); *G06F 15/177* (2013.01)

(58) Field of Classification Search
CPC .. G06F 9/4411; G06F 15/177; G06F 9/44505; G06F 8/60; G06F 9/4451; G06Q 10/02

USPC .................................... 713/1, 2, 100
See application file for complete search history.

(56) References Cited

U.S. PATENT DOCUMENTS

| | | | |
|---|---|---|---|
| 9,379,941 B2* | 6/2016 | Dubs | G06F 9/44505 |
| 2010/0318701 A1* | 12/2010 | Srinivasan | G06Q 10/10 |
| | | | 713/100 |
| 2017/0255880 A1* | 9/2017 | Daher | H04N 7/183 |
| 2017/0286126 A1* | 10/2017 | Artman | G06F 8/654 |
| 2018/0174076 A1* | 6/2018 | Fukami | H04W 12/08 |
| 2019/0385370 A1 | 12/2019 | Boyapalle et al. | |
| 2020/0380784 A1 | 12/2020 | Iyer et al. | |
| 2021/0096630 A1 | 4/2021 | Hamlin et al. | |
| 2021/0256733 A1 | 8/2021 | Iyer et al. | |

(Continued)

*Primary Examiner* — Ji H Bae
(74) *Attorney, Agent, or Firm* — Larson Newman, LLP

(57) ABSTRACT

Shared hoteling workspaces and computer equipment are preconfigured based on location. A location associated with a mobile device is monitored. As the mobile device moves toward a workspace, computer peripheral equipment assigned to the workspace are identified and a best known configuration is retrieved. As the mobile device continues moving toward the workspace, the mobile device installs the best known configuration. Location-based policies and configuration events are defined and executed to ensure the best known configuration is timely installed. When the mobile device arrives at the workspace, the mobile device has been automatically configured to the computer peripheral equipment at the workspace. The mobile device is thus preconfigured, perhaps just in time, for immediate productivity and optimum user experience. Moreover, when the location of the mobile device no longer matches the workspace, the best known configuration may be automatically deleted to conserve memory.

20 Claims, 7 Drawing Sheets

(56) References Cited

U.S. PATENT DOCUMENTS

2023/0127644 A1* 4/2023 Li .................... G06F 3/0486
                                                                     345/2.2
2023/0144231 A1* 5/2023 Persson ............ G06Q 10/06
                                                                     705/5

* cited by examiner

LOCATION-BASED COMPUTER CONFIGURATION

FIELD OF THE DISCLOSURE

This disclosure generally relates to information handling systems, and more particularly relates to configurating diverse computer peripherals assigned to reservable, hybrid workspaces.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

Shared workspaces and computer equipment are preconfigured based on location. In today's work from home environment, employees infrequently visit office buildings. Cubicles, desks, and their accompanying computer equipment are thus shared by different employees in a hoteling arrangement. Should an employee reserve a workspace, a location of the employee's personal device (such as a smartphone or laptop computer) is monitored. As the employee enters the building and walks to the reserved workspace, the employee's personal device is automatically preconfigured for use with keyboards, displays, printers, and other computer peripheral equipment assigned to the workspace. The employee's personal device, in particular, identifies and installs a best known configuration representing drivers, firmware, and other software that best interfaces with the computer peripheral equipment assigned to the workspace. Different location-based configuration policies may be implemented, based on a locational proximity of the employee's personal device to the workspace. When the employee arrives at the cubicle, desk, or other workspace, the employee's smartphone and laptop computer are ready to use with the keyboards, displays, printers, and other computer peripheral equipment assigned to the workspace. The employee may thus immediately and productively use the computer peripheral equipment, without manual configurations that consume precious reserved time. Moreover, when the location of the employee's personal device no longer matches the workspace, the employee may be assumed to have vacated the workspace. The configurations may thus be automatically deleted to conserve memory space in the employee's personal device.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
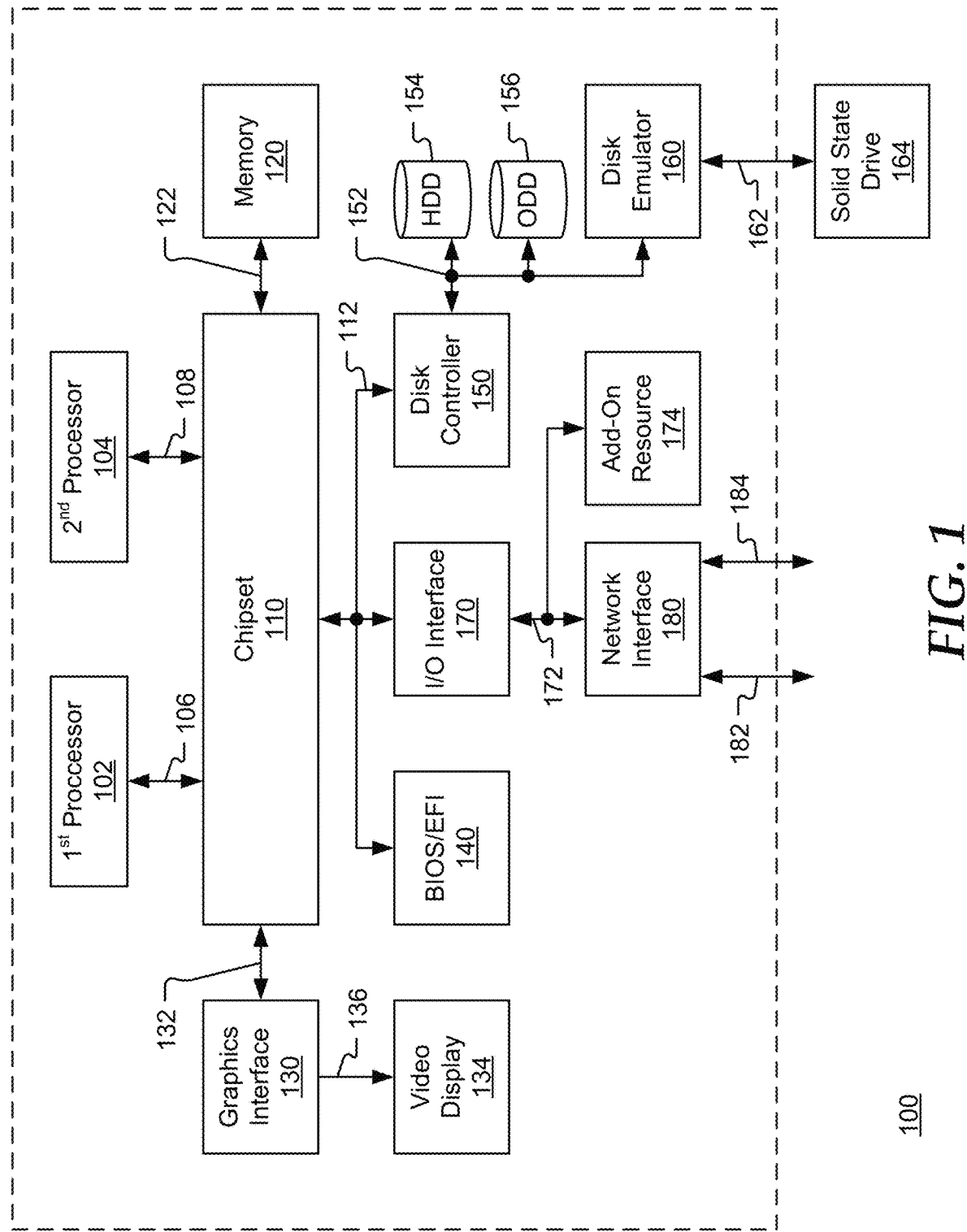
FIG. 1 is a block diagram of a generalized information handling system.

FIG. 1 illustrates an embodiment of an information handling system 100 including processors 102 and 104, chipset 110, memory 120, graphics adapter 130 connected to video display 134, non-volatile RAM (NV-RAM) 140 that includes a basic input and output system/extensible firmware interface (BIOS/EFI) module 142, disk controller 150, hard disk drive (HDD) 154, optical disk drive (ODD) 156, disk emulator 160 connected to solid state drive (SSD) 164, an input/output (I/O) interface 170 connected to an add-on resource 174, and a network interface device 180. Processor 102 is connected to chipset 110 via processor interface 106, and processor 104 is connected to chipset 110 via processor interface 108.

Chipset 110 represents an integrated circuit or group of integrated circuits that manages data flow between processors 102 and 104 and the other elements of information handling system 100. In a particular embodiment, chipset 110 represents a pair of integrated circuits, such as a north bridge component and a south bridge component. In another embodiment, some or all of the functions and features of chipset 110 are integrated with one or more of processors 102 and 104. Memory 120 is connected to chipset 110 via a memory interface 122. An example of memory interface 122 includes a Double Data Rate (DDR) memory channel, and memory 120 represents one or more DDR Dual In-Line Memory Modules (DIMMs). In a particular embodiment, memory interface 122 represents two or more DDR channels. In another embodiment, one or more of processors 102 and 104 include memory interface 122 that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a peripheral component interconnect-express interface (PCIe) and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided on a system printed circuit board (PCB). Video display output 136 can include a digital video interface (DVI), a high definition multimedia interface (HDMI), DisplayPort interface, or the like. Video display 134 can include a monitor, a smart television, an embedded display such as a laptop computer display, or the like.

NV-RAM 140, disk controller 150, and I/O interface 170 are connected to chipset 110 via I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller 150 to HDD 154, to ODD 156, and to disk emulator 160. Disk interface 152 may include an integrated drive electronics (IDE) interface, an advanced technology attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, SSD 164 can be disposed within information handling system 100.

I/O interface 170 includes a peripheral interface 172 that connects I/O interface 170 to add-on resource 174, to TPM 176, and to network interface device 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a sound card, data storage system, an additional graphics interface, another add-on resource, or a combination thereof. Add-on resource 174 can be on a main circuit board, a separate circuit board or an add-in card disposed within information handling system 100, a device that is external to the information handling system, or a combination thereof.

Network interface device 180 represents a network communication device disposed within information handling system 100, on a main circuit board of the information handling system, integrated onto another element such as chipset 110, in another suitable location, or a combination thereof. Network interface device 180 includes a network channel 182 that provides an interface to devices that are external to information handling system 100. In a particular embodiment, network channel is of a different type than peripheral channel 172 and network interface device 180 translates information from a format suitable to the peripheral channel to a format suitable to external devices. In a particular embodiment, network interface device 180 includes a host bus adapter (HBA), a host channel adapter, a network interface card (NIC), or other hardware circuit that can connect the information handling system to a network. An example of network channel 182 includes an InfiniBand channel, a fiber channel, a gigabit Ethernet channel, a proprietary channel architecture, or a combination thereof. Network channel 182 can be connected to an external network resource (not illustrated). The network resource can include another information handling system, a data storage system, another network, a grid management system, another suitable resource, or a combination thereof.

The information handling system 100 may include a baseboard management controller (BMC). The BMC is connected to multiple elements of information handling system 100 via one or more management interface to provide out of band monitoring, maintenance, and control of the elements of the information handling system. As such, BMC represents a processing device different from processors 102 and 104, which provides various management functions for information handling system 100. In an embodiment, BMC may be responsible for granting access to a remote management system that may establish control of the elements to implement power management, cooling management, storage management, and the like. The BMC may also grant access to an external device. In this case, the BMC may include transceiver circuitry to establish wireless communications with the external device such as a mobile device. The transceiver circuitry may operate on a Wi-Fi channel, a near-field communication (NFC) channel, a Bluetooth or Bluetooth-Low-Energy (BLE) channel, a cellular based interface such as a global system for mobile (GSM) interface, a code-division multiple access (CDMA) interface, a universal mobile telecommunications system (UMTS) interface, a long-term evolution (LTE) interface, another cellular based interface, or a combination thereof. A mobile device may include Ultrabook, a tablet computer, a netbook, a notebook computer, a laptop computer, mobile telephone, a cellular telephone, a smartphone, a personal digital assistant, a multimedia playback device, a digital music player, a digital video player, a navigational device, a digital camera, and the like.

The term BMC may be used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller, and embedded controllers included at the blades of the blade server can be referred to as blade management controllers. Out-of-band communication interfaces between BMC and elements of the information handling system may be provided by management interface that may include an inter-integrated circuit (I2C) bus, a system management bus (SMBUS), a power management bus (PMBUS), a low pin count (LPC) interface, a serial bus such as a universal serial bus (USB) or a serial peripheral interface (SPI), a network interface such as an Ethernet interface, a high-speed serial data link such as PCIe interface, a network controller-sideband interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

In an embodiment, the BMC implements an integrated remote access controller (iDRAC) that operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC includes a network interface that can be connected to a remote management system to receive firmware updates, as needed or desired. Here BMC receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC utilizes various protocols and application programming interfaces (APIs) to direct and control the processes for monitoring and maintaining the system firmware. An example of a protocol or API for monitoring and maintaining the system firmware includes a graphical user interface (GUI) associated with BMC, an interface defined by the Distributed Management Taskforce (DMTF) (such as Web Services Management (WS-MAN) interface, a Management Component Transport Protocol (MCTP) or, Redfish interface), various vendor defined interfaces (such as Dell EMC Remote Access Controller Administrator (RACADM) utility, Dell EMC Open Manage Server Administrator (OMSS) utility, Dell EMC Open Manage Storage Services (OMSS) utility, Dell EMC Open Manage Deployment Toolkit (DTK) suite), representational state transfer (REST) web API, a BIOS setup utility such as invoked by a "F2" boot option, or another protocol or API, as needed or desired.

In a particular embodiment, BMC is included on a main circuit board (such as a baseboard, a motherboard, or any combination thereof) of information handling system 100, or is integrated into another element of the information handling system such as chipset 110, or another suitable element, as needed or desired. As such, BMC can be part of an integrated circuit or a chip set within information handling system 100. BMC may operate on a separate power plane from other resources in information handling system 100. Thus BMC can communicate with the remote management system via network interface or the BMC can communicate with the external mobile device using its own transceiver circuitry while the resources or elements of information handling system 100 are powered off or at least in low power mode. Here, information can be sent from the remote management system or external mobile device to BMC and the information can be stored in a RAM or NV-RAM associated with the BMC. Information stored in the RAM may be lost after power-down of the power plane for BMC, while information stored in the NV-RAM may be saved through a power-down/power-up cycle of the power plane for the BMC.

In a typical usage case, information handling system 100 represents an enterprise class processing system, such as may be found in a datacenter or other compute-intense processing environment. Here, there may be hundreds or thousands of other enterprise class processing systems in the datacenter. In such an environment, the information handling system may represent one of a wide variety of different types of equipment that perform the main processing tasks of the datacenter, such as modular blade servers, switching and routing equipment (network routers, top-of-rack switches, and the like), data storage equipment (storage servers, network attached storage, storage area networks, and the like), or other computing equipment that the datacenter uses to perform the processing tasks.

Errors may be difficult to diagnose and to debug. Pre-boot errors (such as hardware errors occurring during a power-on self-test operation) are conventionally detected by the BIOS 142. In order to diagnose and to debug these pre-boot hardware errors, a more complex software stack (such as an operating system or OS) is required. A large and memory-intensive operating system, in other words, must be executed to diagnose and to debug problem issues such as network connectivity, GPU errors, MKTME-based errors, VPN, RADIUS Authentication (MS-CHAP), and other hardware-based errors. The conventional BIOS 142 lacks capabilities to resolve pre-boot errors.

Remote diagnosis is also challenging. Remote OS install and OS recovery on a bare metal computer machine may be accomplished using cloud-based service support (such as Dell's BIOSConnect platform that allows BIOS to connect to an HTTP backend and load an image). A bare metal computer machine refers to a computer executing instructions stored or written to logic hardware without the intervening operating system. However, the inventors have realized that a bare metal computer machine launching BIOSConnect over a VPN network is difficult to repeatedly accomplish. The BIOS 142 must include a network software stack for network connectivity, which is complex and time consuming to develop.

In today's hybrid work hoteling environment, performance and peripherals are not identical across shared workspaces. As the reader knows, information handling systems may interface with a wide variety of computer peripheral devices (such as printers, monitors, wireless keyboards, digital pens, and audio/video headsets). When a user arrives at a hotel or office building, some cubicles may have high-performance computers, displays, and sound systems for gaming, video editing, and music production. Other desks and cubicles, though, may only be equipped with common computer equipment for word processing, emailing, and other general tasks. As users hot-swap such diverse workspaces, their configurations (such as drivers, firmware, and other software) greatly vary and often produce unsatisfactory user experiences and performance. Moreover, these configuration problems are further compounded in today's hybrid work hoteling environment, where users bring their own laptops, smartphones, headphones, speakers, and other personal devices.

Figure 2:
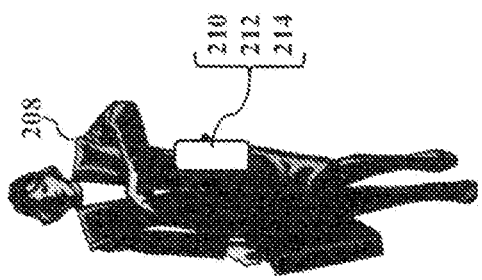
FIGS. 2-3 illustrate a workspace-sharing environment, according to exemplary embodiments.
Figure 2:
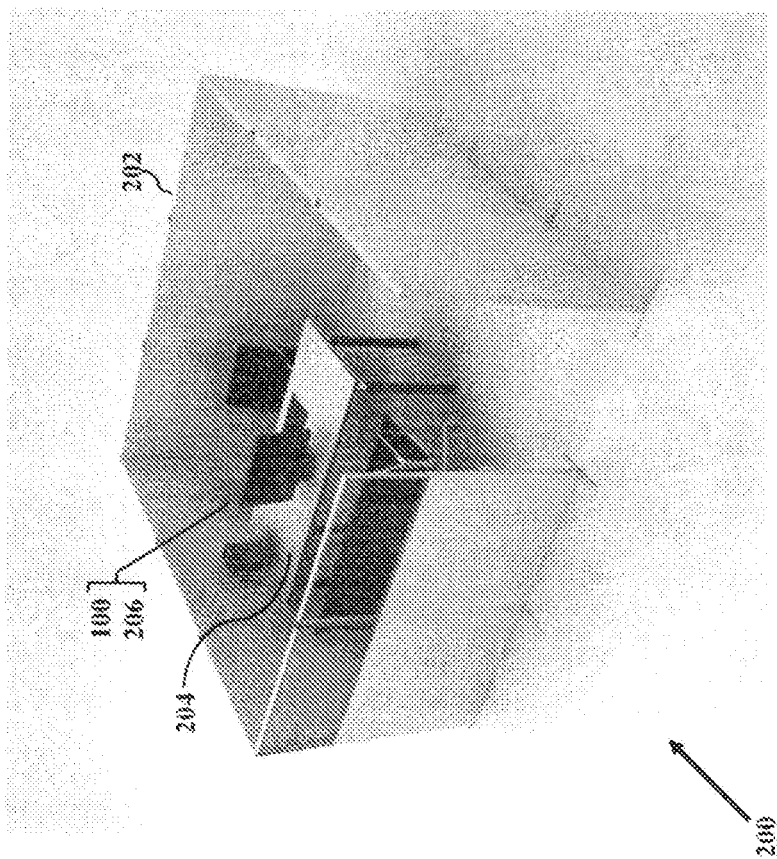
Figure 3:
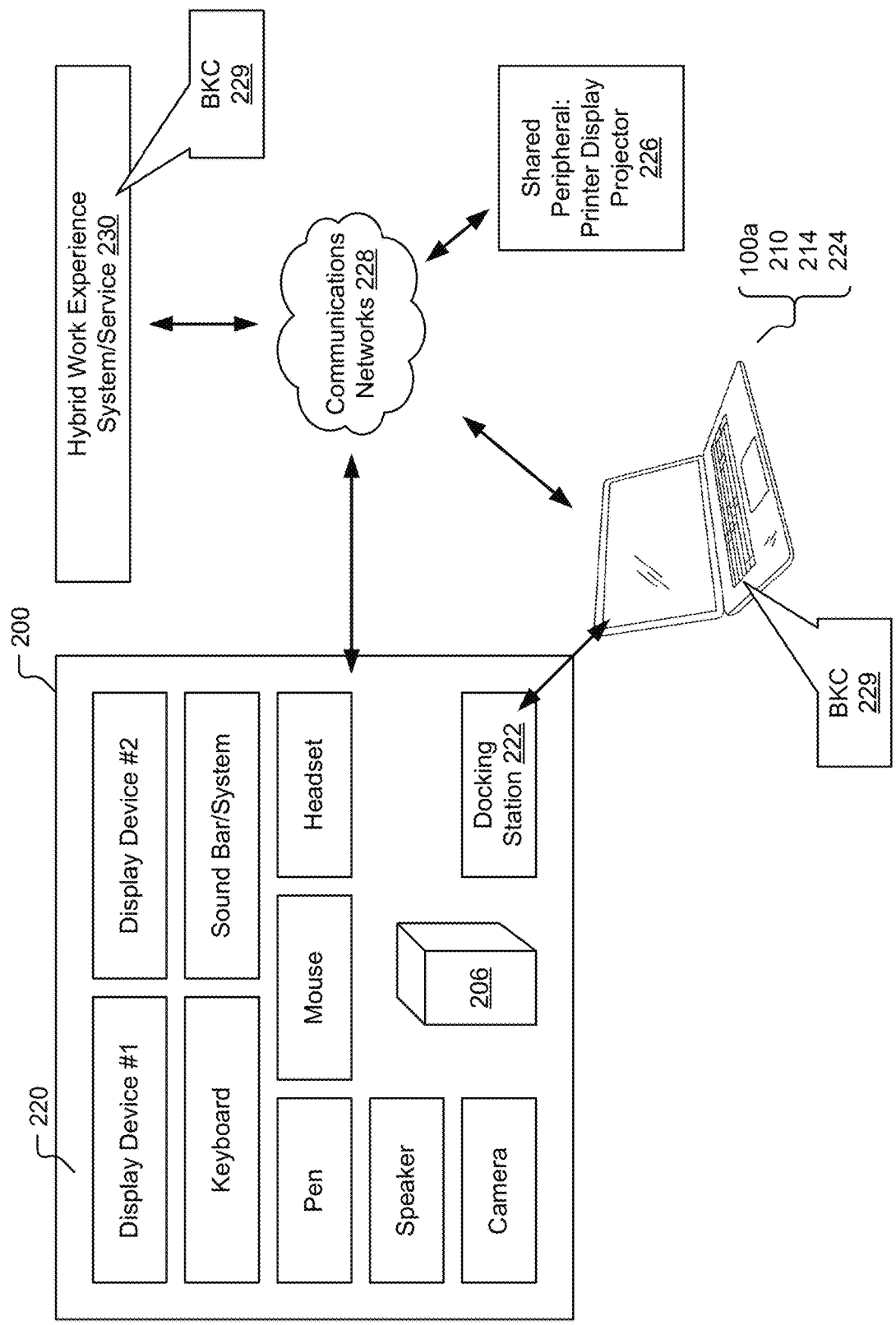

FIGS. 2-3 illustrate a workspace-sharing environment, according to exemplary embodiments. FIG. 2 illustrates a shared workspace 200 found in many office buildings, hotels, libraries, and other shared environments. The workspace 200 is available for use by transient employees, hotel guests, patrons, and other users. FIG. 2 illustrates the workspace 200 as a generic cubicle 202 having a desk 204 and the information handling system 100 (illustrated as a desktop computer 206). Because the workspace 200 is shared by many different users, an occupant 208 has reserved the workspace 200 for a period of time. As the occupant 208 walks through a building and to the workspace 200, exemplary embodiments infer her physical location 210, based on electromagnetic signals (such as GPS, radio, WI-FI, Bluetooth, NFC signals) transmitted by her personal device(s) 212.

FIG. 2 illustrates the occupant's personal device 212 as a mobile or cellular smart telephone 214. The occupant's personal device 212, however, may be a smartwatch, mobile laptop computer, a tablet computer, BLUETOOTH® devices (for example, headphones, speakers, goggles, and pens), an electronic employee/visitor badge, or any other electronic device. As the occupant 208 carries the smartphone 214, the personal device 212 establishes wireless communications with various communications networks (such as cellular/GPS, radio, WI-FI®, BLUETOOTH®, NFC signals) available within an office, hotel, or other building. As the occupant 208 walks, exemplary embodiments infer her indoor/outdoor location 210, based on GPS and/or network presences registered by her personal device 212. Exemplary embodiments may thus pre-configure the desktop computer 206 to her preferred settings, based on the hardware and software resources associated with the personal device 212. So, when the occupant 208 arrives at the workspace 200, the desktop computer 206 has already been optimally configured, just in time, for the best user experience compatible with the personal device 212.

FIG. 3 further illustrates electronic equipment 220 available within the workspace 200. The workspace 200 may have a diverse inventory of computer equipment and peripheral accessories. Some of these peripheral devices 220 may include a keyboard, one or more video displays, a tactile mouse, a digital pen, external speaker(s), a video/web camera, a sound bar system, and/or a headphone. The workspace 200 may further have a docking station 222 for quick connections to the peripheral devices 220. When the user/occupant 208 illustrated in FIG. 2) plugs her personal device 212 (such as a mobile information handling system 100a, illustrated as a laptop computer 224) into the docking station 222, the docking station 222 provides a convenient interface to the many wired/wireless peripheral devices 220. Moreover, any or all of the electronic peripheral equipment 220 may interface with one or more shared peripherals 226 (such as a shared networked printer, display, or projector) via a communications network 228. The workspace 200 may thus be an electronic ecosystem of many different devices, perhaps of different manufacturers and models, wiredly or wirelessly connected to the laptop computer 224, to the docking station 222, and to the communications network 228.

The shared workspace 200 poses many configurational problems. For example, even though the occupant's laptop computer 224 plugs into (perhaps via a USB cable) the docking station 222, the laptop computer 224 must still store the proper software drivers, firmware, and other configurations for using the cubicle's peripheral devices 220 and 226. If the occupant's laptop computer 224 lacks the proper configuration, then the cubicle's peripheral devices 220 and 226 may not correctly function. Indeed, if the occupant's laptop computer 224 lacks the proper software driver for the keyboard or video display, then the work session is unproductive and perhaps wasted. Similarly if the occupant's laptop computer 224 lacks the proper software driver, then the shared printer 226 may be unavailable. The laptop computer 224 must also be configured to utilize any BLUETOOTH® headphones, 3D goggles, and other wireless devices. For maximum productivity and user experience, then, the occupant's laptop computer 224 must be properly configured to use the workspace 200.

These configurational problems substantially grow in the hybrid work environment. Am office, hotel, or other building may have many different hybrid or shared "hoteling" cubicles, desks, and other workspaces 200. The different workspaces 200 often contain different hardware, software, and the peripheral equipment 220. Moreover, because many employees/users bring their own laptops 224, smartphones 214, and other personal devices 212, the number of different configurations is great and complex. These configuration problems reduce the occupant's productivity and, perhaps, render the workspace 200 useless for the occupant's needs.

These configurational problems also frustrate IT administration. In the hybrid work environment, users/employees may select and book/reserve the workspace 200, perhaps for a period of time, based on the available peripheral equipment 220. The occupant 208 often selects the workspace 200 primarily based on the peripheral equipment 220 that meets a performance need or the nature of work. Indeed, IT administration sees end users booking different cubicles 202 for different times during the day. The end users switch cubicles 202 throughout the day, as their peripheral needs change. While a subset of the peripheral equipment 220 may be mostly common across the workspaces 200, some particular cubicles 202 or desks 204 have workspace-specific peripheral equipment 220. For a better and consistent workspace experience, then, IT administration may not always want the latest and greatest software drivers per device. IT administration is thus tasked with the frustrating job of managing an extremely diverse selection of configurations to ensure the best user experience.

A best known configuration (or "BKC") 229 may thus be deployed. The BKC 229 is a package of drivers, firmware, and other software applications that are determined to work well together, given the variability in the desktop computer 106, the peripheral equipment 220 and 226, the docking station 222, and the occupant's personal devices 214. With the introduction of the hybrid workspaces 200 with transactional manageability experiences, there are likely many different BKCs 229 (given the different types of peripheral equipment 220 and 226 deployed in different cubicles 202, and the many different makes and models of the occupant's personal devices 214) to meet end user productivity requirements. For example, the workspaces 200 may mostly or uniformly have the common docking station 222 and display monitor. However, some limited number of particular cubicles 202 may also have a cubicle-specific webcam and computer input puck. Furthermore, the occupants 208 may bring a great variety of manufacturers and models of laptop computers 224, smartphones 214, and other personal devices 212. Maintaining the BKC 229 is thus a challenge, as some of the drivers and firmware are common to mostly all the workspaces 200, while other drivers and firmware are specific to the reserved workspace 200 and with respect to the occupant's personal devices 212. These various BKCs 229 are similarly applicable to gaming workspaces and to small/home office (or SOHO) environments, where there are both a) common peripherals across the cubes, and b) cube-specific peripherals.

The inventors have also realized that the BKC 229 can vary with proximity. Because some of the peripheral equipment 220 (such as the shared peripherals 226) may be shared among multiple user/occupants in multiple workspaces 200, the BKC 229 may dynamically change in response to the occupant's location 210. For example, for a better end-user experience, as the occupant moves about the office, her shared network peripherals 226 may change with the location 210. The BKC 229 should point to the nearest shared peripheral 226 (such as the closest printer), based on the location 210. Any shared networked resource that is too distant from the current location 210 (as defined by the policy 248, such as 50 feet) may be considered inconvenient, unproductive, and/or a less than desired user experience (such as a printer down or across a floor). Simply put, the BKC 229 must be managed to reflect the workspace's dedicated peripheral equipment 220 and the proximity to shared peripheral equipment 226 for best user experience and productivity.

As FIG. 3 illustrates, exemplary embodiments automatically, and perhaps just-in-time, deploy the one or more best known configurations ("BKC") 229. A hybrid work experience system or service 230 is a computer server or cloud-based service that determines the BKC 229 that is appropriate for the peripheral equipment 220 dedicated to the workspace 200. The hybrid work experience system/service 230 may also identify the BKC 229 that is appropriate for the shared peripheral equipment 226 in proximity to the location 210. The hybrid work experience system/service 230 may then send or push the BKC(s) 229 via the communications network 228 to the IP address associated with the occupant's personal device 212 (illustrated as the laptop 224). In particular, exemplary embodiments may use the location 210 of the laptop 224 to trigger configuration downloads and installs.

The hybrid work experience system/service 230 may thus interface with the laptop 224 to manage the selection and installation of the BKCs 229, based on the workspace 200 and on the laptop's current location 210. That is, as the occupant 208 walks through the building, on her way to the workspace 200, at some point (for example, a predefined location and/or time) the hybrid work experience system/service 230 begins configuring her laptop 224 to the peripheral equipment 220 assigned to the workspace 200. That is, the hybrid work experience system/service 230 determines which BKC 229 is needed for the cubicle's electronic peripheral equipment 220.

As the occupant 208 continues walking and carrying the laptop 224, at some other predefined point (such as another location and/or time) the hybrid work experience system/service 230 instructs the laptop 224 to retrieve, download, and install the BKC 229. The laptop 224, in other words, may make the BKC 229 operational to coincide with her arrival at the workspace 200. When the occupant 208 arrives at the workspace 200, her laptop computer 224 has automatically acquired and installed the drivers, firmware, and other software for productively using the peripheral equipment 220 (dedicated to the workspace 200) and the shared peripheral equipment 226. The occupant wastes no time solving configuration problems. The occupant may thus immediately use the workspace 200 to create and share content, conduct video conference calls, play games/media, and other productive tasks.

Exemplary embodiments provide an immediate and productive workspace ecosystem experience. In today's work environment, more and more people are working from home and only hoteling or sharing office workspaces 200. Workspace productivity is a premium during limited, reserved times use. Because the workspace 200 is shared, the configurations of the electronic peripheral equipment 220 must be dynamically established, in timely succession, according to a reservation schedule and to the occupant's location 210. Because the workspace's shared electronic peripheral equipment 220 may be just-in-time preconfigured for the occupant's arrival date/time reservation, the occupant 208 has an immediate best experience with the electronic peripheral equipment 220 and, by inference, the employer, hotel, library, landlord, owner, or building's service provider. Exemplary embodiments deliver continuity of service across multiple end user devices. Exemplary embodiments manage seamless fusion and selection of audio/video input and outputs, content sharing, and conferencing. Exemplary embodiments solve basic interoperability pain points across clients, docks, and ecosystem devices.

Exemplary embodiments automatically preconfigure client devices using the location 210. Because there are many different operational combinations (for example, different peripheral equipment 220 dedicated to different workspaces 200, different shared peripheral equipment 226 in proximity to the different workspaces 200, and different personal devices 212), there will likely be many different best known configurations ("BKCs") 229. Exemplary embodiments may thus consult databases that map or relate the various combinations of peripherals 220, 226 and personal devices 212 to their corresponding BKCs 229 (as this disclosure later explains). Exemplary embodiments may thus perform database lookups to identify and distribute the BKCs 229 to any network destination or IP address. The peripherals 220, 226 and/or the occupant's personal devices 212 may thus be instructed or commanded to install the BKCs 229 to coincide with the occupant's arrival. Exemplary embodiments thus manage the BKC 229 for the set of cubicle and shared peripherals according to the occupant's personal devices 212 for the hybrid work environment. The BKC 229 may be pushed, perhaps in a locationally or tiered manner, based on events and states (as this disclosure later explains).

Exemplary embodiments, in particular, may dynamically identify and push the BKC 229. As the occupant 208 moves within the work environment, the location 210 of the occupant's personal device 212 (such as the laptop computer 224 and/or the smartphone 214) changes. The personal device 212 may thus move away from one shared peripheral 228 and become more closely-proximate to a different shared peripheral 228. Because the personal device 212 may periodically report its location 210, exemplary embodiments are notified of locational changes in nearly real time and may perform additional database lookups for the corresponding BKC 229. Exemplary embodiments may thus identify, retrieve, and install different BKCs 229, in response to locational changes, for better overall user experiences. Conventional BKC schemes only consider the hardware/software resources of the end-user's device. Exemplary embodiments, instead, improve computer functioning by dynamically selecting the BKC 229 based on peripherals and location [such as the (end user's personal device 212)× (dedicated peripheral equipment 220)×(status & proximity of shared peripheral equipment 226)×(hybrid work events)]. Exemplary embodiments may also pre-configure the peripherals 220 and 226 to optimally interface with the personal device 212. When the occupant 208 arrives at the workspace 200, the workspace 200 has already been optimally configured, just in time, for the best user experience.

Figure 4:
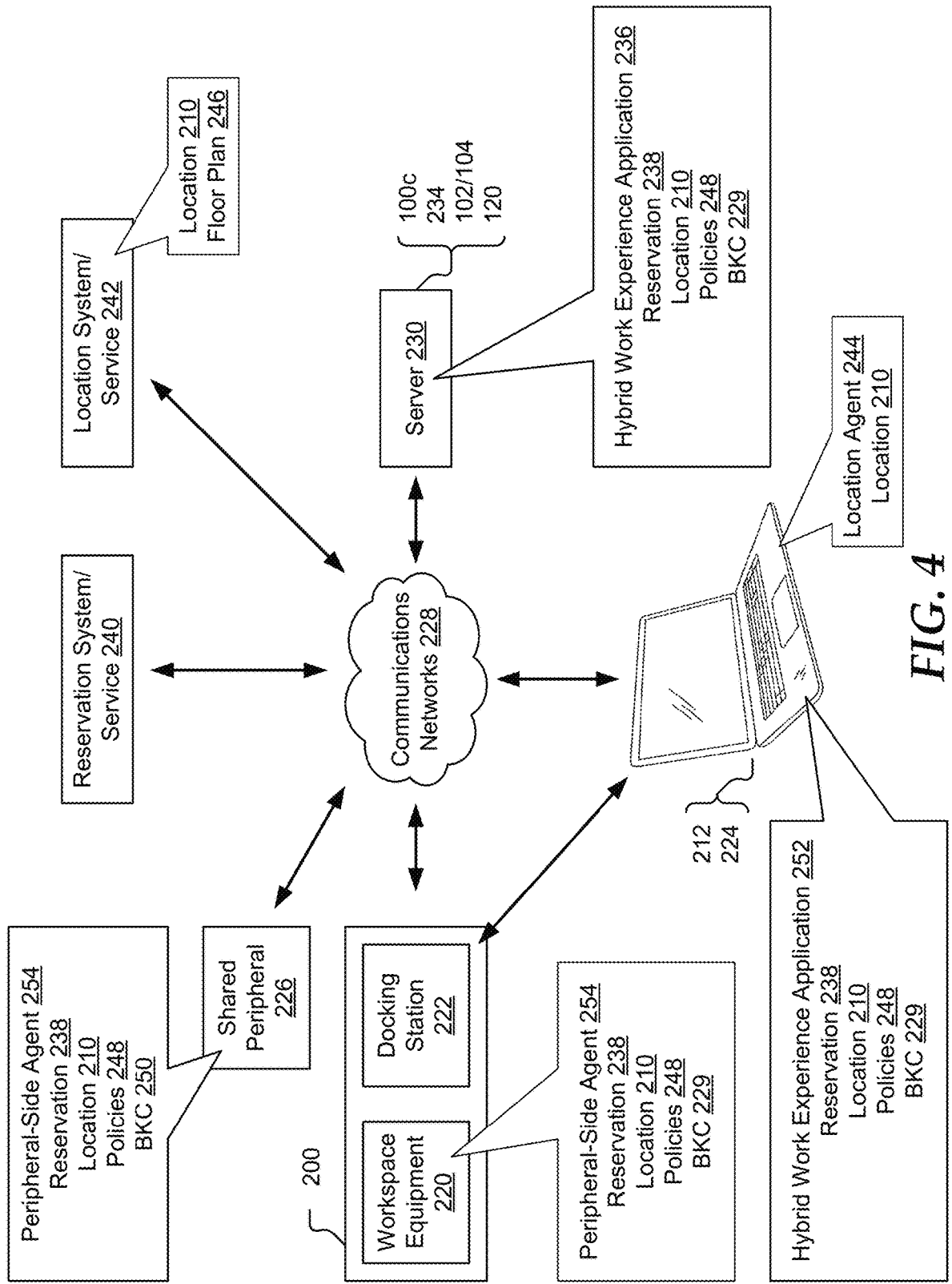
FIG. 4 illustrates proximity-based configuration, according to exemplary embodiments.

FIG. 4 illustrates more details for proximity-based configuration, according to exemplary embodiments. The hybrid work experience system/service 230 is another information handling system 100c and illustrated as a server 234. The server 234 stores, executes, and/or hosts a hybrid work experience software application 236. The hybrid work experience software application 236 is stored in the memory 120, and the hardware processors 102/104 execute the programming statements or languages representing the hybrid work experience software application 236. The hybrid work experience software application 236 causes the server 234 to specially perform operations, such as receiving a workspace reservation 238 associated with the occupant's personal device 212 (illustrated as the laptop 224). The occupant 208 (illustrated in FIG. 1), in other words, has scheduled the workspace 200 from a start date/time to an end date/time. The occupant 208 may have further requested the workspace 200 for its hardware and software resources.

While the workspace reservation 238 may be determined and managed by the hybrid work experience software application 236, FIG. 4 illustrates a service solution in which the workspace reservation 238 is generated by, and sent from, a reservation system 240. The reservation system 240 may be a cloud-based service, third party, or computer server (not shown for simplicity) that schedules different, shared workspaces 200 among individuals, teams, or other entities. The reservation system 240 matches available workspaces 200 to requests, perhaps according to date/time and to the requested hardware and software resources. Gaming engineers or users, for example, may require the highest performance workspaces. Video editors and digital artists may need the highest-resolution display capabilities. The reservation system 240 determines the appropriate workspace 200 and provides the workspace reservation 238 via the communications network 228 to the hybrid work experience system/service 230, to the occupant's personal device 212, and/or to the electronic peripheral equipment 220.

The hybrid work experience system/service 230 may also receive the location 210. While the location 210 may be determined and managed by the hybrid work experience system/service 230, FIG. 4 illustrates a service solution in which the location 210 is generated by, and sent from, a location system 242. The location system 242 is a cloud-based service, third party, or computer server (not shown for simplicity) that interfaces with the occupant's personal devices 212 (such as the laptop 224) and with the hybrid work experience system/service 230. The laptop 224 stores and executes a device-side location software agent 244. The device-side location software agent 244 is a software application that cooperates with the location system 242, perhaps in a client/server relationship, to specially perform operations, such as determining the location 210 associated with laptop 224 and, by inference, the individual occupant 208.

The location system 242, for example, may obtain a GPS location reported by the laptop 224 (such as when GPS signals are received within a building). The location system 242 may additionally or alternatively infer the location 210 (such as an indoor position) based on reception of electromagnetic signals sent by or received from the occupant's laptop 224. As the occupant 208 carries the laptop 224, the laptop 224 sends signals to, and/or registers with, various access points to the communications networks 228 (for example, cellular/GPS, radio, WI-FI®, BLUETOOTH®, NFC signals) available within an office, hotel, or other building. Because the occupant 208 is associated with her laptop 224, the laptop's indoor location 210 is inferred by the location system 242 (perhaps based on signal strength and/or access point (AP) information) and sent via the communications network 228 to the hybrid work experience system/service 230 and/or to the location software agent 244. The location system 242 and/or to the location software agent 244 may even consult a digital floor plan 246 that maps different workspace locations (such as the location of the cubicle 202) to the various communications networks 228 available within the building. As the occupant walks within the building, the location system 242 may nearly precisely estimate and update the location 210 with respect to the digital floor plan 246 (such as nearing an elevator or at a particular floor level, hallway, entry, room, or the cubicle 202).

Governing policies 248 may be implemented. Once the laptop's location 210 is determined (perhaps with reference to the floor plan 246), the location 210 may be compared to the policies 248 (perhaps accessed by querying a policy database for the location 210 and retrieving/identifying the corresponding location-based policy). The policies 248 define events and/or states to order or implement, based on the laptop's location 210. The policies 248, for example, may be expressed as logical statements defining where and when certain best known configurations ("BKC") 229 are commenced or updated. As the laptop 224 travels within the building, the hybrid work experience system/service 230 may push or command particular BKCs 229, based on the location 210.

Exemplary embodiments may thus dynamically manage the best known configuration ("BKC") 229. The hybrid work experience system/service 230 may also interface with a device-side hybrid work experience software agent 252 stored and executed by the occupant's personal device 212 (such as the laptop 224). The hybrid work experience system/service 230 may also interface with a peripheral-side software agent 254 stored and executed by any or all of the workspace's electronic peripheral equipment 220 and/or the shared peripherals 226. The hybrid work experience system/service 230 cooperates with the software agents 244, 252, and 254, perhaps in a client/server relationship, to specially perform operations, such as dynamically installing the BKC 229, based on the location 210. As laptop 224 moves through the building and toward the workspace 200, exemplary embodiments inventory the peripherals 220 and 226 associated with the workspace 200 and/or with the location 210.

Exemplary embodiments identify the BKC 229 that is associated with the inventory. As laptop 224 moves through the building and toward the workspace 200, exemplary embodiments cause or instruct the laptop 224 to install the corresponding BKC 229 for immediate, productive use. That is, as soon as the occupant 208 arrives at the cubicle 202 (illustrated in FIG. 2), the laptop computer 223 is configured to immediately interface with, and use, the cubicle's dedicated peripheral equipment 220 and the shared peripherals 226. The occupant wastes no time resolving configuration errors and downloading drivers. The occupant may thus immediately use the workspace 200 to create and share content, conduct video conference calls, play games/media, and other productive tasks.

Figure 5:
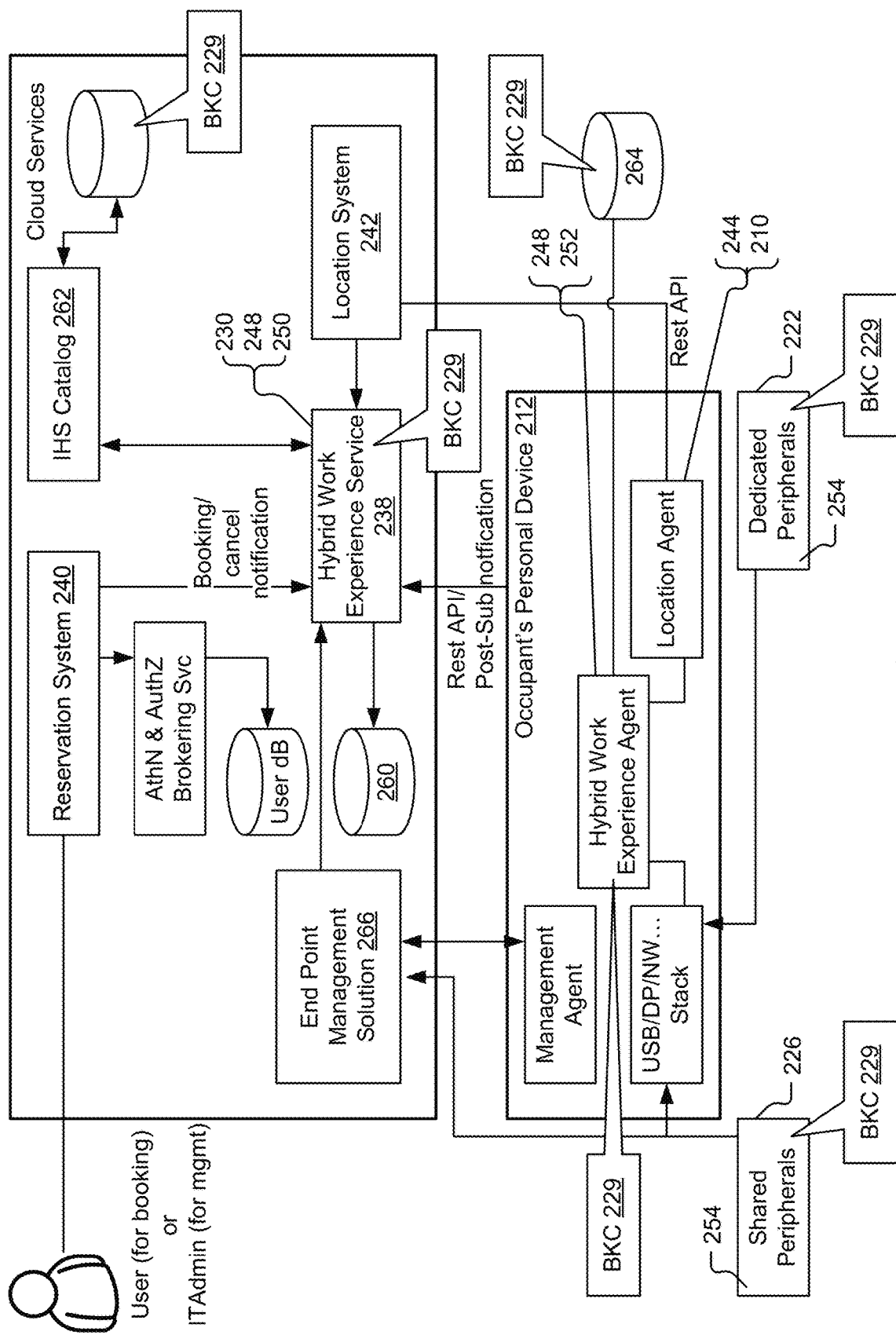
FIG. 5 is a block diagram illustrating a service architecture, according to exemplary embodiments.

FIG. 5 shows a service architecture, according to exemplary embodiments. The location system 242 is illustrated as a cloud service that interfaces with the occupant's personal device 212. The occupant's personal device 212 stores and executes the device-side location software agent 244 that cooperates with the location system 242 to determine the location 210. The location 210 is thus sent to or shared with the hybrid work experience system/service 230. The reservation system 240 is illustrated as a cloud service that interfaces with the hybrid work experience system/service 230. The reservation system 240 generates and manages the workplace reservation 238 and sends the workplace reservation 238 to the hybrid work experience system/service 230. When the hybrid work experience system/service 230 receives the workplace reservation 238 and the location 210, the hybrid work experience system/service 230 may retrieve the best known configuration (or "BKC") 229.

The hybrid work experience system/service 230 may consult an electronic database 260 of peripherals. The workplace reservation 238 specifies the workspace 200 (such as a cubicle, desk, or other workspace identifier), the stop/state dates/times, the reserving user/occupant (name or ID), and the occupant's personal device 212 (such as a device identifier assigned to the occupant's smartphone 214 or laptop 224). Because the hybrid work experience system/service 230 receives the workplace reservation 238, the hybrid work experience system/service 230, and/or its device-side agent 252, may identify the peripheral equipment 220 and 226 available at the reserved workplace 200. Exemplary embodiments may query the electronic database 260 of peripherals. The electronic database 260 of peripherals stores and maintains database entries describing an inventory of peripheral devices (such as the electronic peripheral equipment 220 & 226) available at different, reservable workplaces 200 and location 210.

The electronic database 260 of peripherals identifies equipment models, serial numbers, IP addresses, networking and other configuration parameters, and any other information/data associated with any piece of the electronic peripheral equipment 220 assigned to the corresponding workspace 200 and location 210. The electronic database 260 of peripherals may thus be a relational table having columnar/row entries that map or associate each transient/hoteling workspace 200 (such as the cubicle/desk identifier) to its corresponding electronic peripheral equipment 220 and 226 (such as models, manufacturers, networking information, IP addresses, drivers, firmware, IEEE 802 MAC identifiers, and other configuration data, LAN/WAN/WWAN networking data, and other configuration parameters) and to the corresponding best known configuration (or "BKC") 229. Exemplary embodiments may query the electronic database 260 of peripherals, perform a database lookup, and identify and retrieve the BKC 229 associated with the workspace 200.

The hybrid work experience system/service 230 may consult a computer catalog 262. The computer catalog 262 provides a comprehensive hardware and software database inventory for different information handling systems. While the computer catalog 262 may have any hardware and network implementation, FIG. illustrates the computer catalog 262 as a cloud service that interfaces with the hybrid work experience system/service 230. When the hybrid work experience system/service 230 receives the workplace reservation 238, the hybrid work experience system/service 230, and/or its device-side agent 252, identifies the occupant's smartphone 214, laptop 224, or other personal device 212 that associated with the reserved workspace 200. Exemplary embodiments may thus query the computer catalog 262 (perhaps for the device identifier) and/or perform a database lookup for the corresponding entries. The computer catalog 262 identifies the hardware and software installed on the occupant's smartphone 214, laptop 224, or other personal device 212 (perhaps according to model, manufacturer, serial number, or other device identifier). The computer catalog 262 thus reveals an inventory of the hardware components and software resources (for example, drivers, firmware, and other applications) installed on the occupant's personal device 212.

Exemplary embodiments may thus identify configurational needs. The hybrid work experience system/service 230 and/or its device-side agent 252 cooperate and compare the peripheral drivers, firmware, and other BKC 229 configuration data (revealed by the electronic database 260 of peripherals) to the reserved device's drivers, firmware, and other configuration data (revealed by the computer catalog 262). If the occupant's personal device 212 lacks any required, necessary, or desired driver, firmware, and other configuration, exemplary embodiments may command the occupant's personal device 212 to execute a configuration download of the BKC 229. While the BKC 229 may be locally retrieved, FIG. 5 illustrates a remote resource database 264. Once the BKC 229 is determined, the occupant's personal device 212 may query the resource database 264 (via the communications network 228) and receive a query response specifying or including the BKC 229.

Exemplary embodiments thus present an elegant solution for proximity-based configurations. The end point management solution 266 manages the occupant's personal device 212 and the peripheral equipment 220 and 226 (such as their working statuses and availability). The reservation system 240 generates and manages the reservations 238 and books/schedules the cubicles 202, desks 204, and other workspaces 200. The location system 242 periodically generates the location 210 with respect to the floor plan 246 (illustrated in FIG. 4) and provides the dynamic 3D location (perhaps in GeoJSON format) of the reserved end-user inside the hybrid workspace/floor based on request. The device-side location agent 244 interfaces with the location system 242 and receives the location 210. The device-side location agent 244 also compares the location 210 to the policies 248 and identifies the corresponding location-based events (such as "entry to building," "approach to floor," and "approach to cube"). The computer catalog 262 stores, identifies, and manages the BKC 229 associated with the occupant's personal device 212 and the peripheral equipment 220 and 226. The hybrid work experience system/service 230 interacts with the location system 242 and the end point management solution 266 to maintain the tiered BKC 229 at the computer catalog 262 and/or the BKC resource database inventory 264.

As FIG. 5 illustrates, exemplary embodiments may configure based on the location 210. The occupant's personal device 212 stores and executes the device-side hybrid work experience software agent 252. The occupant's personal device 212 also stores and executes the device-side location software agent 244. The hybrid work experience system/service 230, the device-side hybrid work experience software agent 252, and/or the device-side location software agent 244 may thus cooperate to determine the location 210 associated with the occupant's personal device 212. The hybrid work experience system/service 230 may thus interface with the device-side hybrid work experience software agent 252 and the device-side location software agent 244 to periodically or nearly continuously monitor the location 210 and to execute the corresponding configuration policies 248.

The hybrid work experience system/service 230 and the device-side hybrid work experience software agent 252 thus cooperate and compare the location 210 to the policies 248. When the location 210 matches a location-based policy 248, exemplary embodiments execute the location-based policy 248. For example, when the occupant's laptop computer 224 is present in the building (based on its location 210), perhaps at 15 minutes prior to the reservation 238, exemplary embodiments may commence determining and downloading the corresponding BKC 229. By the time the occupant's personal device 212 arrives at the workspace 200, exemplary embodiments have automatically configured the occupant's smartphone 214, laptop 224, and other personal devices 212 with the BKC 229 optimized for the peripheral equipment 220 and 226 associated with the workspace 200. Because the location 210 may be periodically monitored and updated, any change in the location 210 may cause a re-evaluation of the BKC 229.

Proximity-based configuration is especially helpful for the shared peripheral equipment 226. Even though the occupant 208 has reserved the workspace 200, during the reservation 238 the occupant 208 may move/walk and visit other cubicles or conference rooms in different locations. As the occupant carries her personal device 212, exemplary embodiments may periodically monitor and reacquire the current location 210 associated with her smartphone 214 and/or laptop computer 224. As her personal device 212 moves, the personal device 212 may move away from, or out of wireless range from, a networked printer or other shared peripheral 226 and, instead, become proximate to, or within wireless range of, a different networked printer or other shared peripheral 226. Because the location 210 has changed, exemplary embodiments may query the electronic database 260 of peripherals for the new/current location 210 and identify the network-shared printer, display, projector, or other shared peripheral 226 associated with the new/current location 210. The electronic database 260 of peripherals thus identifies the drivers, firmware, and other BKC 229 that are optimized for that location 210. So, as the occupant's personal device 212 moves, exemplary embodiments may dynamically identify and update the BKC 229 according to the latest location 210. Exemplary embodiments may thus instruct the occupant's personal device 212 to acquire and to install the BKC 229 for the best user experience at that current location 210.

Exemplary embodiments thus provide an elegant configuration solution for hoteling users. The location system 242 and the location agent 244 cooperate to identify the current location 210 associated with the occupant's personal device 214, perhaps correlated to the floor plan 246. The current location 210 may be determined in any geographical coordinates, units, or GIS format (such as the GeoJSON format). Once the current location 210 is determined, the hybrid work experience agent 252 maintains and manages a hybrid work state machine 270. The hybrid work experience agent 252 and the hybrid work experience system/service 230 cooperate to identify, retrieve, and/or pull the BKC 229 associated with the equipment 220 and 226 and location 210. The hybrid work experience agent 252 may then install the BKC 229, just-in-time, for the location 210.

Exemplary embodiments may also cleanup configurations. As the reader may realize, software programs can bloat a computer and consume precious memory resources. The BKC 229, for example, may require many megabytes, or even gigabytes, of memory hard drive space. Furthermore, the BKC 229 may not be relevant, or needed, once the reservation 238 ends. Because the BKC 229 is tailored to the reserved workspace 200 and to the location 210, the BKC 229 is likely unused in a different workspace or when the occupant returns home. Exemplary embodiments may thus remove, or delete, the BKC 229 after the reservation 238 ends. That is, the hybrid work experience agent 252, the hybrid work experience system/service 230, and the location agent 244 may cooperate to delete the drivers, firmware, and other configuration components representing the BKC 229 from the occupant's personal device 212, perhaps based on the location 210 and/or time.

For example, when the laptop computer 224 moves or strays from the cubicle 202 (say>X meters) for more than a predefined time, exemplary embodiments may infer the occupant's reservation has ended and/or the workspace 200 has been vacated. The hybrid work experience agent 252, the location agent 244, and the hybrid work experience system/service 230 may cooperate to remove the BKC 229 and delete any stored data from the smartphone 214, from the laptop 224, or from any other personal device 212. Similarly, the hybrid work experience agent 252, the location agent 244, and the hybrid work experience system/service 230 may cooperate to delete any reservation-related configurational data from the workspace 220 (such as from the desktop computer 206, from the docking station 222, and from the peripherals 220 and 226). Exemplary embodiments may thus only temporarily install and use the BKC 229 during the reservation 236, thus freeing up memory resources for other uses.

Exemplary embodiments thus provide a seamless, zero-touch proximity-based hybrid work solution. Exemplary embodiments monitor the dynamic location 210 and compare to the static location associated with the workspace 200. Exemplary embodiments receive user/occupant intentions (such as start and stop a session with the docking station 222) and take actions. Exemplary embodiments thus provide an auxiliary service that automatically manages reservations, the peripheral endpoints, and the BKC 229 based on device proximity mapping (such as the indoor location 210). Moreover, because hybrid work environments likely have many different and assignable workspaces 200, exemplary embodiments may scale for multiple reserved users and hybrid work cubes.

Figure 6:
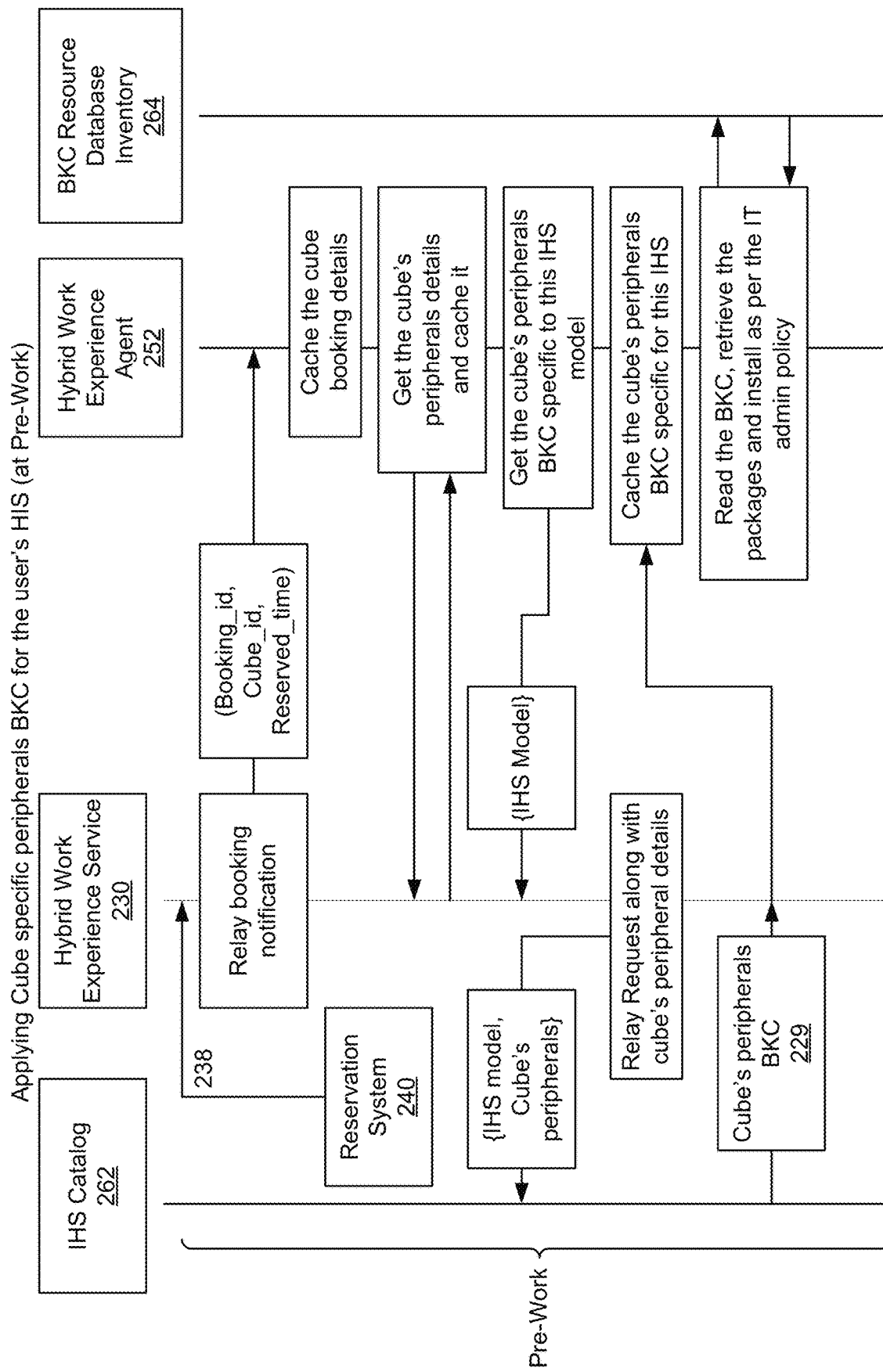
FIGS. 6-7 illustrate algorithmic flowgraphs for software-based dynamic configurations in hybrid work environments, according to exemplary embodiments.
Figure 7:
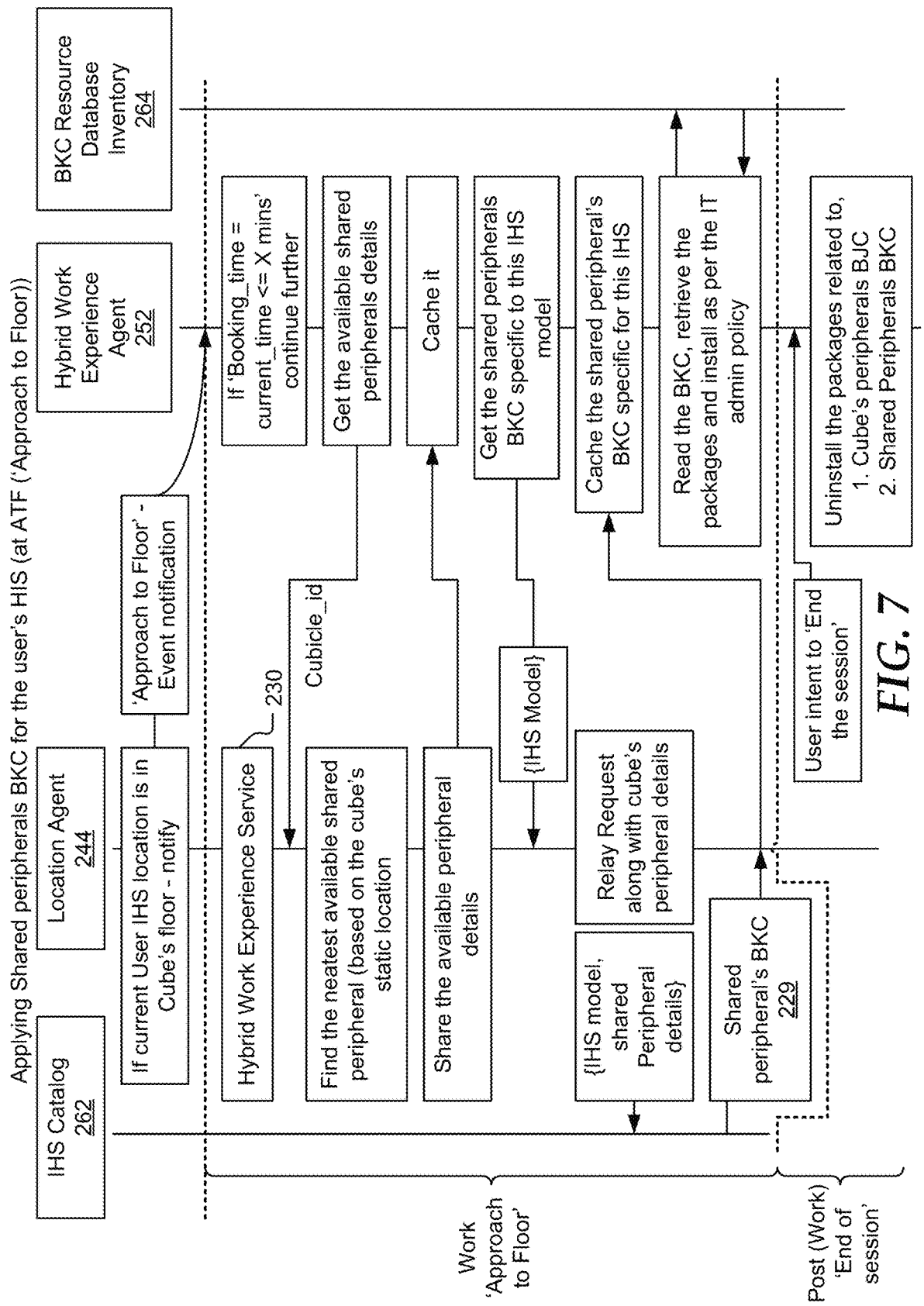

FIGS. 6-7 illustrate algorithmic flowgraphs for dynamic configurations in hybrid work environments, according to exemplary embodiments. The hybrid work experience agent 252 is downloaded to the user's personal device 212 (such as the smartphone 214 and/or the laptop computer 224 illustrated in FIG. 3). When the hybrid work experience agent 252 executes, the hybrid work experience agent 252 pulls the policies 248 from any network resource. While the policies 248 may have any logical structure or statement, at least some of the policies 248 may be location-based (for example, "distance to the cube for starting work=X feet," "timeout for reservation=Y mins," and "distance from cube for switching shared peripheral=Z feet"). After the policies 248 are retrieved, the hybrid work experience agent 252 may then wait for the next event (such as the reservation 238 describing a cube booking). The hybrid work experience agent 252 may thus maintain a state-machine that implements different states, perhaps based on the location 210.

FIG. 6 illustrates pre-work states. When the future occupant makes the reservation 238, exemplary embodiments prepare the user's personal device 212 for the reserved workspace 200. The static location associated with the workspace 200 is retrieved, along with its corresponding peripheral equipment 220 and/or shared peripherals 226. The BKCs 229 for the peripheral equipment 220, the shared peripherals 226, and the reserving occupant's personal device 212 are retrieved (perhaps from the catalog 262 and/or the BKC resource database inventory 264). The BKCs 229 are mapped whenever there is an addition/removal in model of IHS or cube/shared peripheral. BKCs 229 may also be added whenever there is an update to a BKC itself. The hybrid work experience agent 252 may rely on these resources for maintaining the proper BKC 229 for the personal device 212 and its internal componentry devices (like onboard webcam, audio, . . . ).

When the hybrid work experience server/service 230 receives the reservation 238, the hybrid work experience server/service 230 notifies the hybrid work experience agent 252 of the reservation details (such as time, date, cubicle, and personal device 212). The hybrid work experience agent 252 queries back the hybrid work experience server/service 230 for the correct BKC 229, given the personal device 212. On this query request, the hybrid work experience server/service 230 connects with catalog 262 to retrieve and to send the BKCs 229 associated with the cubicle's peripheral equipment 220 and/or shared peripherals 226, again given the personal device 212. The hybrid work experience agent 252 also queries the hybrid work experience server/service 230 to identify the static location associated with the cubicle 202. The hybrid work experience agent 252 then instructs the personal device 212 to store all this data in cache memory 120.

FIG. 7 illustrates work states. The hybrid work experience server/service 230 interfaces with the location system 242 and the location agent 244 to monitor the current location 210 associated with the reserving personal device 212. The location agent 244 compares each location 210 to the policies 248. If any location 210 matches the location-based policy 248, or lies within a specified range of values, then the location agent 244 executes the corresponding event or state. For example, when the location 210 indicates the user is located within the building and approaching the cubicle's floor, and near the booking start time, the policy 248 may have the location agent 244 inform the hybrid work experience agent 252 of an "approach to floor" event or state, which causes the hybrid work experience agent 252 to send the booking-id, cubicle-id, and make/model/identifier of the personal device 212 to the hybrid work experience server/service 230.

The hybrid work experience server/service 230 may then identify the static location associated with the workspace 200, along with its corresponding peripheral equipment 220 and/or shared peripherals 226. The BKCs 229 for the peripheral equipment 220, the shared peripherals 226, and the reserving occupant's personal device 212 are retrieved (perhaps from the catalog 262 and/or the BKC resource database inventory 264) and sent back to the hybrid work experience agent 252 of an "approach to floor" event or state, which causes the hybrid work experience agent 252. In case the shared peripheral 226 is an exclusive device (such as a large TV/monitor or projector), the hybrid work experience server/service 230 and/or the hybrid work experience agent 252 may check for the current usage and the booking time window. If the shared peripheral 226 is not currently in use, then its details and its BKC 229 may also be shared.

FIG. 7 also illustrates a post-work state. The user's intent to end the work session may be inferred from a disconnection of the laptop 224 from the docking station 222. The user's intent to end the session may also be inferred from the location 210 straying too far from the static location of the workspace 200, perhaps for a predetermined max/min time (say 10 mins). On entering this post-state, the hybrid work experience agent 252 notifies the hybrid work experience system/service 230 that the user's personal device 212 (such as the smartphone 214 and/or the laptop computer 224) has left the cubicle 202 and, thus, intent to end the session. On post-work (that is, end of work session), the BKCs 229 associated with the peripherals 222 and 226 may be deleted from the occupant's personal device 212. The BKCs 229 may also be deleted from the peripherals 222 and 226. However, the end point management solution 266 (illustrated in FIG. 5) may store any of the BKCs 229 for future uses and quicker implementations.

Duplicate resources may be switched. When the occupant arrives at the workspace 220, the occupant may discover that the workspace 220, and her personal device 212, both have similar peripherals. For example, a webcam may be installed in the cubicle 202, and her laptop 224 may also have an installed webcam. The occupant, though, may prefer one of the webcams, perhaps based on performance or capabilities. For example, the laptop 224 may have an older 720-pixel webcam, whereas the cubicle 202 offers 1080-pixels. The occupant may thus select or configure the hybrid work experience agent 252 to prefer the cube peripheral 220, and the hybrid work experience agent 252 notifies the hybrid work experience server/service 230. Exemplary embodiments would thus identify, retrieve, and install the BKC 229 that corresponds to the 1080-pixel webcam (cube peripheral 220).

Exemplary embodiments may be easily adapted to home environments. The architecture, software agents, and states illustrated in FIGS. 2-7 may be utilized for shared home spaces with shared peripheral devices. Policies may be defined for the locations of home-based desks, tables, and rooms, their corresponding consumer equipment, and hot-swapping residents.

Exemplary embodiments may connect to other personal devices 212. Many user/occupants, for example, may prefer to connect their personal speaker, mouse, headset, and other peripherals. The user may simply prefer the feel, sound, performance, and other features of her personal devices 212. The hybrid work experience agent 252 may thus store, access, and install any BKC 229 associated with any of the user's personal devices 212. Indeed, as BLUETOOTH®-enabled peripherals grow in popularity and in performance, the inventors envision a full, optimum user experience in hybrid work environments, regardless of their personal devices 212.

Exemplary embodiments may also be adapted for multi-user sharing of the workspace 200. Multiple occupants, in other words, may reserve the workspace 200 for collaboration. In such a collaborative reservation 238, exemplary embodiments may retrieve and install any and all the BKCs 229 associated with any of the user's personal devices 212. The hybrid work experience agent 252 and the hybrid work experience server/service 230 may thus prepare and connect the cube's peripherals 220 and 226 to the users' laptops 224 and other personal devices 212. For example, occupant/user #1 may authorize connecting the cubicle's display, keyboard, and mouse, but she may prefer her personal BLUETOOTH® pen device. Occupant/User #2, however, may decline all the cubicle's peripheral devices 220 and, instead, prefer to connect and use only her personal devices 212.

Exemplary embodiments thus provide elegant solutions for hoteling users. Exemplary embodiments implement actionable events, based on the dynamic location 210, the static location assigned to the workspace 200, and the occupant's intent (such as start/stop of the session). Exemplary embodiments configure the occupant's personal device 212 to the hybrid workspace 200, according to the location 210. The workspace 200 is thus pre-prepared or pre-configured for immediate productivity and user experience. The reservation system 238 and/or the location system 242 may be vendor independent and interface with any management, booking, and location solutions.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving, by an information handling system, a hybrid work experience reservation identifying a hybrid workspace reserved for a hybrid work session;
   successively receiving, by the information handling system, indoor locations generated by a location service, each indoor location of the indoor locations representing a corresponding distance to the hybrid workspace;
   comparing the indoor locations to location-based policies associated with the hybrid workspace;
   in response to a first indoor location of the indoor locations satisfying a policy of the location-based policies and a start time of the hybrid work experience reservation, retrieving a configuration associated with the hybrid workspace;
   installing on another information handling system the configuration associated with the hybrid workspace; and
   in response to detecting a change from the first indoor location to another location, ending the hybrid work experience reservation for the first indoor location.

2. The method of claim 1, further comprising receiving an updated indoor location of the indoor locations.

3. The method of claim 2, further comprising identifying a different configuration that is associated with the updated indoor location.

4. The method of claim 3, further comprising installing the different configuration that is associated with the updated indoor location.

5. The method of claim 1, further comprising identifying a shared wireless peripheral that is associated with the first indoor location.

6. The method of claim 5, further comprising identifying a first configuration that is associated with the shared wireless peripheral.

7. The method of claim 6, further comprising installing the first configuration that is associated with the shared wireless peripheral.

8. A system comprising:
   a hardware processor; and
   a memory device storing instructions that when executed by the hardware processor perform operations, the operations including:
   receiving a hybrid work experience reservation identifying a hybrid workspace reserved for a hybrid work session;
   receiving indoor locations generated by a location service, each indoor location of the indoor locations representing a corresponding distance to the hybrid workspace reserved for the hybrid work session;
   comparing the indoor locations to location-based policies defined for the hybrid workspace;
   in response to a first indoor location of the indoor locations satisfying a policy of the location-based policies and a start time of the hybrid work experience reservation, retrieving a configuration associated with the hybrid workspace;
   installing on another system the configuration associated with the hybrid workspace; and
   in response to detecting a change from the first indoor location to another location, ending the hybrid work experience reservation for the first indoor location.

9. The system of claim 8, wherein the operations further include receiving an updated indoor location of the indoor locations.

10. The system of claim 9, wherein the operations further include identifying a different configuration that is associated with the updated indoor location.

11. The system of claim 10, wherein the operations further include installing the different configuration that is associated with the updated indoor location.

12. The system of claim 8, wherein the operations further include identifying a shared wireless peripheral that is associated with the first indoor location.

13. The system of claim 12, wherein the operations further include identifying a first configuration that is associated with the shared wireless peripheral.

14. The system of claim 13, wherein the operations further include installing the first configuration that is associated with the shared wireless peripheral.

15. A memory device storing instructions that when executed perform operations including:
   receiving a hybrid work experience reservation identifying a hybrid workspace reserved for a hybrid work session;
   successively receiving networking information reported by wireless access points;
   sending the networking information reported by the wireless access points to a location service;
   receiving indoor locations generated by the location service, each indoor location of the indoor locations representing a corresponding distance to the hybrid workspace reserved for the hybrid work session;
   comparing the indoor locations to location-based policies defined for the hybrid workspace;
   in response to a first indoor location of the indoor locations satisfying a policy of the location-based policies and a start time of the hybrid work experience reservation, retrieving a configuration associated with the hybrid workspace;
   installing the configuration associated with the hybrid workspace; and
   in response to detecting a change from the first indoor location to another location, ending the hybrid work experience reservation for the first indoor location.

16. The memory device of claim 15, wherein the operations further include receiving an updated indoor location of the indoor locations.

17. The memory device of claim 16, wherein the operations further include identifying a different configuration that is associated with the updated indoor location.

18. The memory device of claim 17, wherein the operations further include installing the different configuration that is associated with the updated indoor location.

19. The memory device of claim 15, wherein in response to an end of the hybrid work session, the operations further include deleting the configuration associated with the hybrid workspace.

20. The memory device of claim 15, wherein the operations further include triggering an event in response to detecting approach to the another location.

\* \* \* \* \*